United States Patent [19]

Evans

[11] 4,191,606

[45] Mar. 4, 1980

[54] METHOD FOR SECURING COMPOSITION BOARD PANELS TOGETHER

[76] Inventor: Stephen M. Evans, 5514 Edlen Dr., Dallas, Tex. 75220

[21] Appl. No.: 922,111

[22] Filed: Jul. 5, 1978

Related U.S. Application Data

[63] Continuation of Ser. No. 646,333, Jan. 2, 1976, abandoned.

[51] Int. Cl.² .............................................. B32B 31/04
[52] U.S. Cl. ..................................... 156/288; 29/464; 100/199; 156/288; 156/292; 156/293; 156/538; 156/580
[58] Field of Search ............... 156/228, 288, 292, 293, 156/538, 556, 580; 100/199; 29/464

[56] References Cited

U.S. PATENT DOCUMENTS

| | | | |
|---|---|---|---|
| 1,871,492 | 8/1923 | Brennecke | 156/228 |
| 2,454,719 | 11/1948 | Scogland | 156/210 |
| 3,096,145 | 7/1963 | Carnaut | 156/288 |
| 3,243,180 | 3/1966 | Van Ryn | 29/464 |
| 3,558,394 | 1/1971 | Marby | 156/292 |
| 3,736,638 | 6/1973 | Stone | 156/292 |
| 3,794,541 | 2/1974 | Schissler | 156/288 |
| 3,928,106 | 12/1975 | Monlar | 156/292 |
| 3,928,691 | 12/1975 | Knupson | 156/293 |
| 3,969,177 | 7/1976 | Doran et al. | 156/288 |

*Primary Examiner*—Jerome W. Massie
*Attorney, Agent, or Firm*—Howard E. Moore; Larry B. Dwight

[57] ABSTRACT

A method and apparatus for securing two ribbed panels of composition board together to form a single panel having two outer flat surfaces. The method comprises positioning panels on opposite sides of a support member and temporarily securing them to same. An adhesive is applied to the edges of the ribs on the panel and the panels secured to the support member are stacked one over the other. One or more alignment members are placed on one of the panels between two of the ribs, another set of panels are coated with adhesive, and placed on top of the panel with the alignment members so that the alignment member is urged between two corresponding ribs of the lower panel of the set on the upper support member such that the alignment member aligns the ribs of the two juxtapositioned panels as the edges of the ribs meet and are glued together. A modified form of the alignment member allows postioning of the corresponding ribs between the ribs of the matching panel in spaced relationship such that the edges of the ribs do not touch.

3 Claims, 7 Drawing Figures

METHOD FOR SECURING COMPOSITION BOARD PANELS TOGETHER

This is a continuation of application Ser. No. 646,333, filed Jan. 2, 1976, now abandoned.

BACKGROUND OF THE INVENTION

In recent times, a shortage of wood has induced experimentation with new methods of construction in wood products. One such method is to produce a honeycombed core constructed of wood byproducts which may be covered with wood veneers or plastic laminates.

The honeycombed cores are constructed of byproducts comprising ligno-cellulose particles such as sawdust, wood chips, and other similar materials which are combined with binders and other additives and pressed into molds to shape the material by machines and other methods. Some forms of the cellulose material are formed into solid sheets of material commonly known as particle board or hard board depending on the process used.

Other forms of the materials constructed into sheets of material having extensions, such as ribs, extending outwardly from the sheet, such as the material formed by the apparatus and method described in U.S. Pat. No. 3,229,009. Two of the ribbed sheets are then secured together to form a lightweight honeycombed core structure which resists bending and warpage.

The sheets of ribbed construction board are extremely flexible and difficult to handle without breaking prior to assembly of the panels. When the sheets are secured together, usually by glue, the ribs must be matched accurately such that the ribs are aligned to produce a core which may be covered with wood veneers or other materials. If the ribs are misaligned during the binding of same the panels will not be square and thus cannot be sawed accurately in preparation of the final product and the core will have to be destroyed.

Heretofore, the method of aligning and gluing the ribbed composition board has been to hand align the panels. This is time consuming and often results in misalignment of the panels and the cores must then be thrown away or destroyed.

My invention is directed at a method of accurately aligning the ribs to produce a square, honeycombed core for finishing with other materials.

SUMMARY

A method and apparatus to assemble panels of ribbed composition board together to form a honeycombed core with two outer parallel flat surfaces on the exterior of the core.

The panels are secured to support means having flat surfaces with guides secured about the perimeter thereof, to each side of the support means to receive the panels. Eccentric clips are rotated over the edge of the panels to hold the bottom panel in place on the support means when it is inverted. The second panel is then laid within the guides on the support means.

An adhesive is applied to the edges of the ribs of the panels. An alignment member such as a block of wood is secured in two or more places between two ribs on one of the panels.

Another pair of panels are coated with adhesive as hereinbefore described, and the panels are placed on top of the first set such that the alignment members engage the lower panel of the second set between two corresponding ribs on the lower panel, thus aligning each rib in juxtaposed position.

The process is continued until a predetermined number of panels are assembled. The stack of panels with the support means are then placed in a cold press for a predetermined period of time until the adhesive has set. The support means are then removed from the panels, and the resulting honeycombed cores are ready to be finished.

A second embodiment of the alignment member comprises two blocks positioned between a pair of ribs such that a space is formed between the blocks to receive a rib of the matching panel in the space such that the ribs of the two panels will be in spaced relationship.

A primary object of the invention is to provide a method and apparatus for accurate alignment of the ribs on the panels when the panels are assembled into a single unit.

Another object of the invention is to provide the method and apparatus to support the panels while applying adhesive and handling prior to assembly of the panels to prevent damage to the panels.

A further object of the invention is to provide a method and apparatus to align the panels accurately when stacking the panels so that they will easily fit into a press.

A still further object of the invention is to provide a method and apparatus to provide even distribution of pressure over the area of each panel while it is in the press.

A still further object of the invention is to accurately align the panels, minimizing the time required to assemble the panels.

Other and further objects of the invention will become apparent upon referring to the detailed description and drawings annexed hereto.

DESCRIPTION OF THE DRAWING

Drawings of two embodiments of the invention are annexed hereto so that the invention may be better and more fully understood, in which.

Numeral references are used to designate elements of the drawing and like numerals are used to designate like elements throughout the various figures of the drawing.

DESCRIPTION OF A PREFERRED EMBODIMENT

Figure 1:
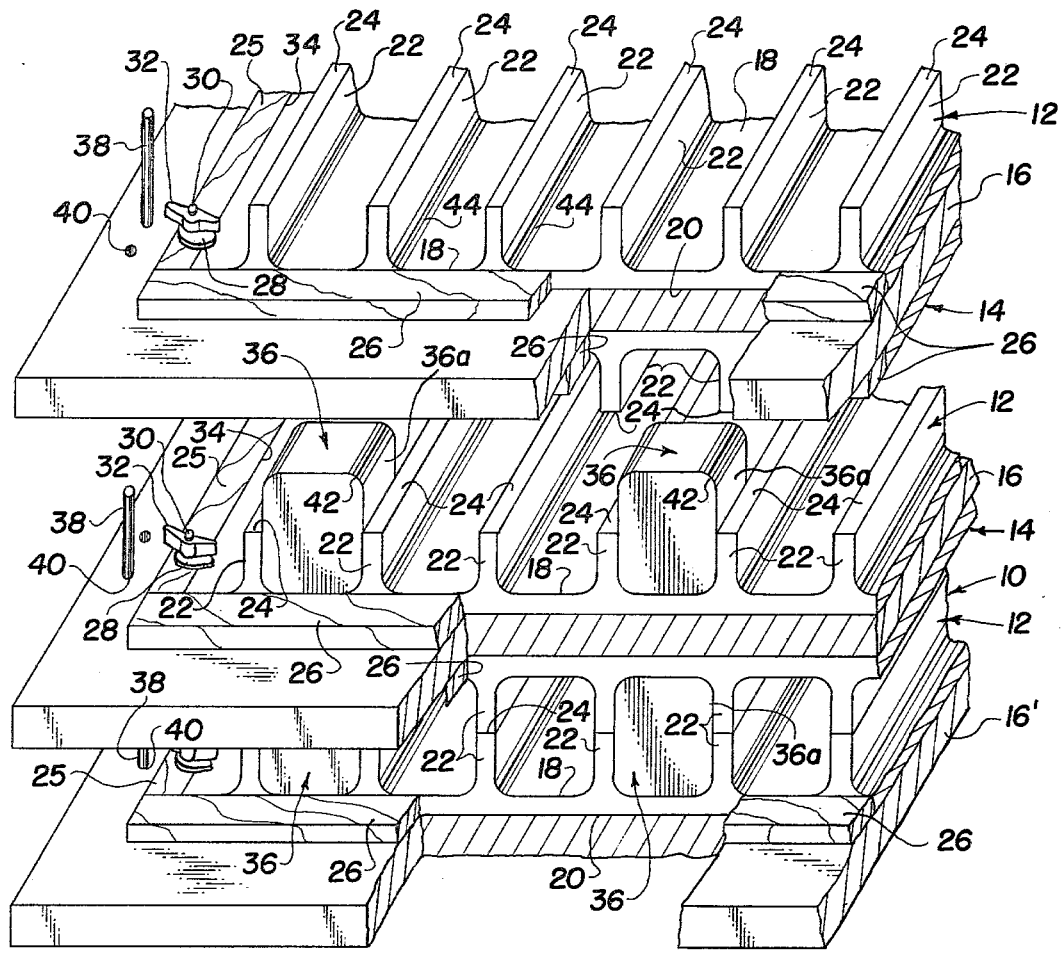
FIG. 1 is an enlarged partially sectionalized perspective view which is exploded to more clearly illustrate the panels and the alignment members.

Referring to FIG. 1 of the drawings the numeral 10 generally designates an assembled core comprising two panels 12 and 14 of composition board. Panels 12 are detachably secured to the upper side of the support means 16 while panels 14 are detachably secured to the lower side of support means 16.

Panels 12 and 14 are substantially identical and are usually comprised of ligno-cellulose particles including but not restricted to wood sawdust, wood chips or other similar material, all preferably of a size which pass through #10 mesh screen, combined with a suitable resin binder. The term "sawdust" as used herein is intended to be generic to the ligno-cellulose particles mentioned above. The quality and characteristics of the board may be varied by use of different binders and additives, such as wax emulsions and/or stearates for lubrication and moisture resistance, ammonia sulphate for fire resistance and the like, without limitation as to the type of binders used.

The ligno-cellulose particles, such as sawdust, may be molded or formed by a method and apparatus for forming composition material such as the one described in U.S. Pat. No. 3,229,009 entitled "A Method and Apparatus for Forming Composition Board".

Panels 12 and 14 have an inner surface 18 and an outer surface 20 which outer surface forms a substantially flat exterior surface of the panels. A plurality of spaced parallel bars or ribs 22 extend outwardly from the inner surface 18 having a thickness equal to the thickness between the inner and outer surfaces 18 and 20. Ribs 22 have edges 24 which are substantially parallel to surface 18.

The panels 12 and 14 are secured to support means 16 which comprises a sheet of flat material such as plywood, particle board, or other suitable member having flat surfaces such as metal or plastic. Support means 16 has right angular guides 25 and 26 thereon which are formed right angularly to each other and are secured to the support means 16 by adhesive or other fastening means about the outer edge of the supports 16.

Figure 6:
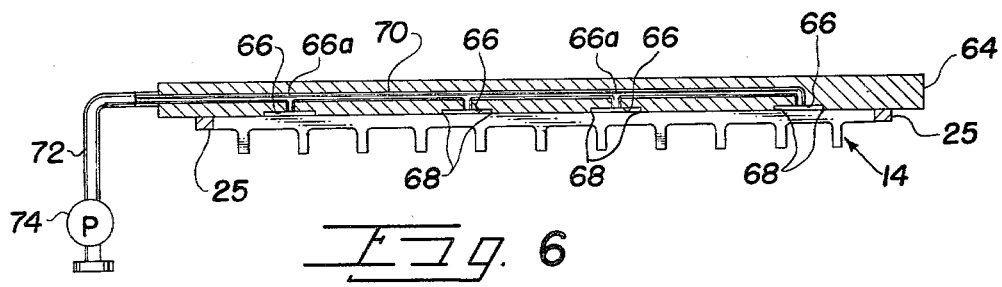
FIG. 6 is a side elevational view of a modified form of the panels securing means.

Support means 16 preferably have guides 25 and 26 located on the four edges of the guide as illustrated in FIG. 6. However, two or three right angularly disposed guide strips is all that is needed to align the panel with the support means 16. In addition, the guides 25 and 26 may be moveable (not shown) on the surface of the support means 16 so as to adjust the size of the area in between the guides 25 and 26 to accept different size panels 12 and 14.

Temporary fastening means to attach the panels to the support may comprise a clip 28 having an eccentric shape rotatably secured about bolt 30 secured in place by wing nut 32 or the like, clip 28 provides a means to temporarily secure the panels 12 and 14 to the support means 16. Rotation of clips 28 to a first direction over the edge 34 of the panels secures the panels to the support means 16 such that when they are inverted they hold panel 14 to the bottom of the support means 16. By loosening nut 32 clip 28 may be rotated away from engagement with the panels to release the panels from the support 16. The clip 28 secures the panels 12 and 14 to the support 16 in fixed position while they are being passed between glue-applying equipment and while being attached together.

Figure 7:
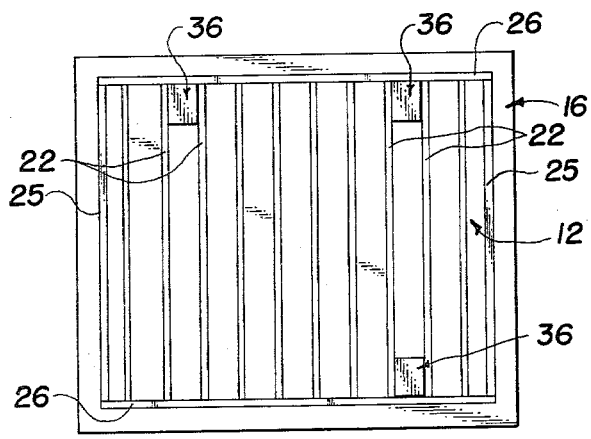
FIG. 7 is a plan view of the support means with a panel attached thereto.

When assembling panels 12 and 14 in to a single core unit 10, alignment member 36 comprising a preshaped block of material such as wood, plastic, composition or the like, are glued or otherwise secured between two ribs 22 of the lower panel 12 in at least two spaced locations as best illustrated in FIG. 7 of the drawings.

The alignment member 36 is preferably a short block, but may extend the entire length of the ribs 22.

As the edges 24 of the ribs 22 of the panel 14 are urged into engagement with panel 12, the alignment member 36 which extends above edges 24 extends between and enters correspondingribs 22 of panel 14 and aligns the ribs 22 of panel 14 in juxtaposed position with ribs 22 of panel 12. It should be readily apparent from the foregoing that the edges 24 are aligned in juxtaposed position due to engaging the upper end 36a of alignment member 36.

The alignment members 36 preferably have relieved corners 42 such as rounded corners in order to fit into round corners 44 formed by the ribs 22 where they are joined by the surface 18 as shown in the preferred embodiment in FIG. 1.

Means is provided to align support means 16 and ribs 22 in vertical relationship such as short staggered dowels 38 extending through apertures 40 formed in support means 16 such that the ribs 22 are aligned vertically in the stack. Other alignment means may be employed such as collapsible rods which extend through holes or notches to align the ribs 22 vertically.

Figure 3:
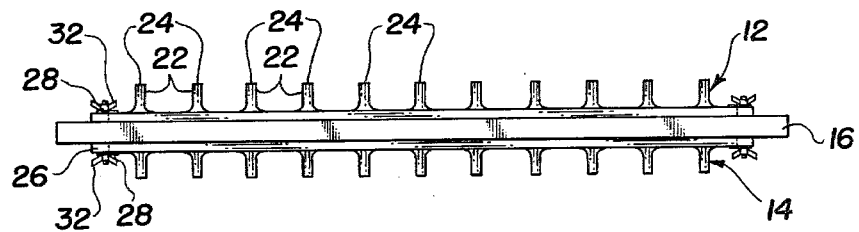
FIG. 3 is an elevational view of a pair of panels secured to a support means.

Operation ofthe hereinbefore described preferred embodiment is as follows:

As illustrated in FIG. 3, lower panel 14 is positioned between guides 25 and 26 on support means 16 and secured thereto by rotation of eccentric clips 28 over the edges 34 of panel 14 at each end.

Panel 12 is secured to support means 16 after it has been inverted and clips 28 are rotated over the edges 34 to maintain panel 12 in place on the support.

The first support means 16' in a stack would most probably only have panel 12 secured thereto.

Adhesive is then applied to edges 24 of ribs 22 of panels 12 and 14 either manually or mechanically.

The alignment members 36 are then secured in place by glue or other means between ribs 22 at two or more positions along the upwardly facing panel 12.

Figure 4:
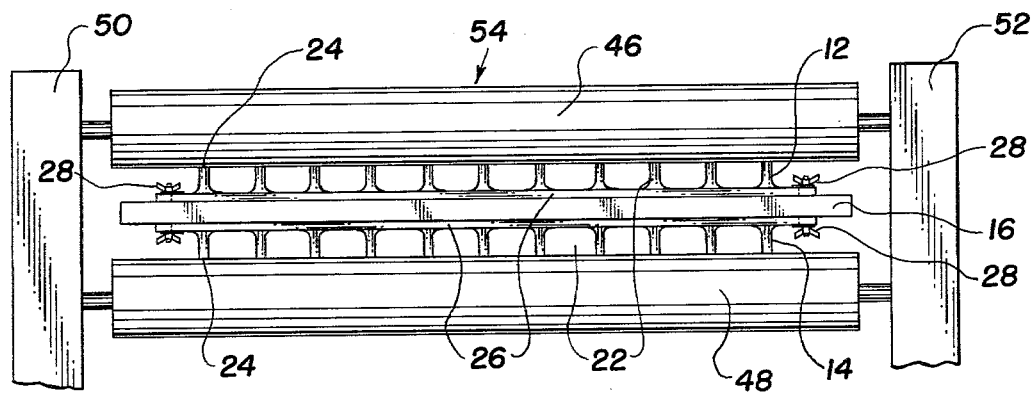
FIG. 4 is a diagrammatic view of the support means with two panels secured thereto as it passes between adhesive applied to the edges of the ribs.

Means for applying adhesive to the edges 24 may include a resilient roll adhesive spreader such as Model 22-D manufactured by Black Brothers of Mendota, Illinois, with a top and bottom coating arrangement as illustrated diagrammatically in FIG. 4 of the drawings. Applicator rollers 46 and 48 have adhesive metered onto their surfaces which are rolled in contact with edges 24 of ribs 22 as the support means 16 and panels 12 and 14 are passed through the rollers 46 and 48. Rollers 46 and 48 are rotatably suported by side plates 50 and 52.

Other means of applying adhesive to the edges 24 of the ribs include glue applicator nozzles aligned in a series over the ribs 22 such that a deposit of a continuous bead of cold setting glue is applied to the edge 24 of the rib or by spraying the adhesive thereon.

After the pair of panels 12 and 14 have been passed through the glue spreader 54, downwardly facing panel 14 is stacked on the upwardly facing panel 12 which has alignment members 36 secured thereto as hereinbefore described.

As best illustrated in FIG. 1 of the drawing, as ribs 22 of panel 14 on the lower side of support means 16 are urged against the ribs 22 of panel 12 the upper ends 36a of alignment members 36 pass between corresponding ribs 22 of panel 14, aligning the ribs 22 such that they meet and are aligned with edges 24 of panel 12 which are glued together into an integral unit.

Figure 5:
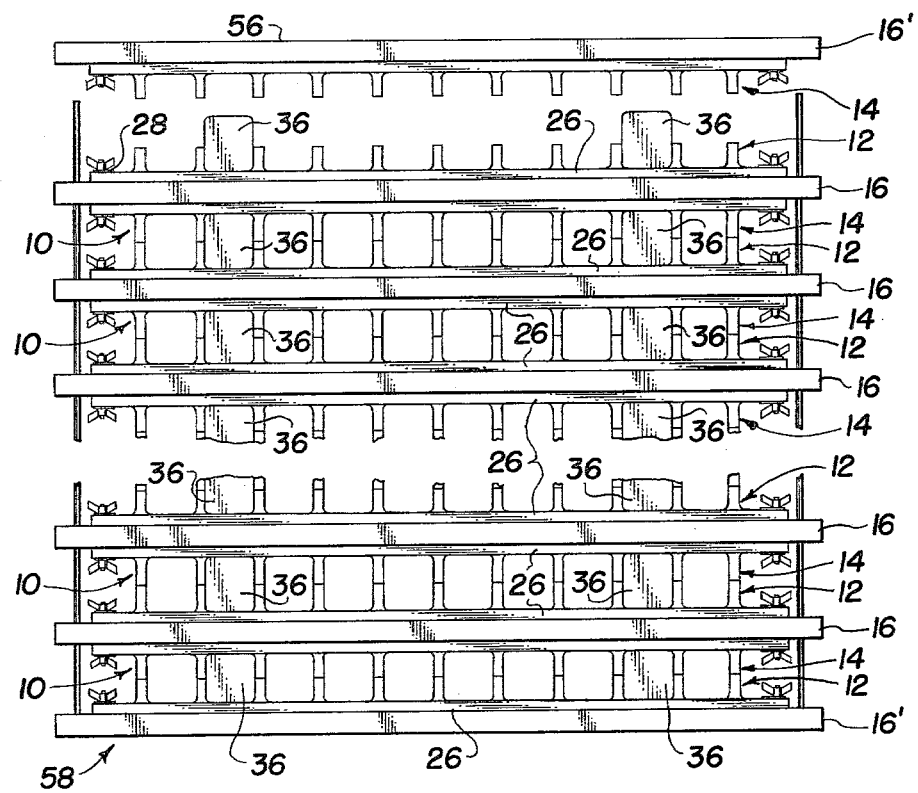
FIG. 5 is a side elevational view of a stack of assembled panels with the support means.

This process is continued until a stack of panels 12 and 14 and support means 16 have been assembled, as illustrated in FIG. 5. Another support means 16' is placed on top with panel 14 thereon and aligned with alignment members 36 such that a smooth surface 56 is formed on the last support means 16'.

The stack of panels 12 and 14 are then positioned in a cold type press for a period of time, for example approximately 30 minutes, where a predetermined pressure, for example 50 poundsper square inch, is applied evenly over the stack 58 of panels.

After the glue has set the support means 16 and 16' are removed from the cores 10 one at a time by disengaging the clips 28 therefrom. The cores 10 are then ready to be finished by first sanding the outer surfaces 20 of the core. The panels may then be sawed to a predetermined size. Veneers and laminates, as desired, may be glued to outer surfaces 20. The veneers or laminates are then positioned in a cold press for a predetermined amount of time and pressure applied thereon. The finished cores are then ready for distribution and marketing.

The double thick core 10 as hereinbefore described has an average density of 55 pounds per cubic foot with a bending strength of 1800 pounds per square inch and modulus of elasticity of 100,000 pounds per square inch. The tensile strength averages 450 pounds per square inch making the core 10 extremely strong for furniture construction considering its weight.

Figure 2:
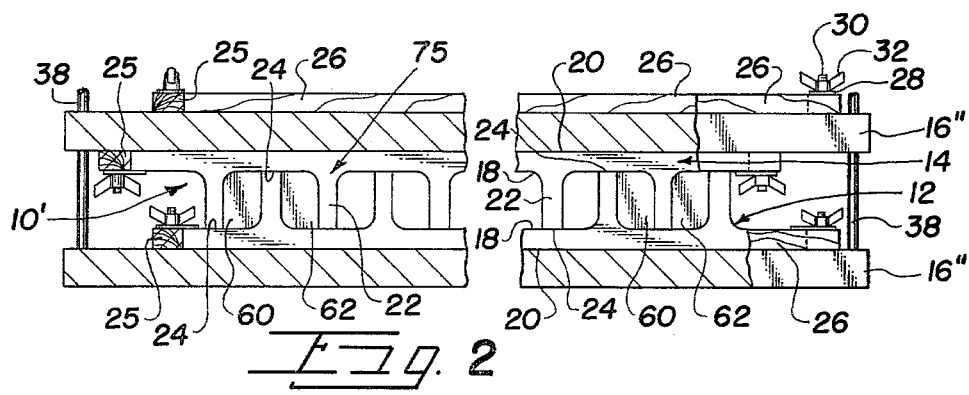
FIG. 2 is a modified form of the alignment member to align the ribs in spaced relationship.

A modified form of the alignment members to make half thickness cores 10' is illustrated in FIG. 2. The alignment members 60 and 62 comprise two separate blocks constructed of wood or plastic or the like having a heighth the same as rib 22 such that the outer surface of blocks 60 and 62 is aligned with edges 24. A space or passage is formed between blocks 60 and 62 when placed adjacent opposed sides of ribs 22 so that corresponding ribs 22 of panel 14 are aligned in the passage between the blocks 60 and 62 and edges 24 engage surfaces 18, forming a core 10' which is half the thickness of core 10 in the preferred embodiment. The guides 25 are offset on the support means 16" in order to accommodate the offset of the spaced ribs 22.

An alternate form of securing the panels 14 to the support means 64 is illustrated in FIG. 6. Panels 14 are sometimes unusually large and it may be necessary to support the panel in the center of the support means 64. Cavities 66 are formed in support means 64 having a resilient seal 68 about the edges which contact surface 20 of panel 14. Cavities 66 communicate through passages 66a with a passage 70 formed in support means 64 which communicates with line 72 connected to vacuum pump 74. Vacuum pump 74 draws a vacuum on line 72 and cavities 66 through passages 66a and 70, pulling surface 20 into engagement with seal 68 and therefore panel 14 against support means 64 such that the air pressure applied to panel 14 will hold the panel against support means 64 when inverted and will be released when the vacuum is released.

It should be readily apparent that alignment of support members 16 by staggered dowels 38, which extend through apertures 40 formed in the support members 16, vertically aligns ribs 22 of each panel. The vertical alignment of ribs 22 provides maximum support when the stack of panels are placed in a press. The support means 16 provide even distribution of forces over the panel cores 10 to prevent flexing which would occur if the ribs 22 are not vertically aligned, thereby distorting flat surfaces 20, which must be flat in order to appear as a solid piece of paneling.

In addition, the guides 25 and 26 may be slightly offset relative to support member 16 to expedite gluing and reduce wear on rollers 46 and 48. Guide strips 25 and 26 may also comprise a row of aligned pins or the like.

It should be apparent that this invention may be used with different shapes and thicknesses of ribbed panels and that the ribs 22 may vary in ratio of thickness compared to the thickness between surfaces 18 and 20.

From the foregoing it should be readily apparent that the embodiments of the invention heretofore described accomplish the objects of the invention hereinbefore discussed.

It should be appreciated that other and further embodiments of the invention may be devised without departing from the basic concept thereof.

Having described my invention, I claim:

1. A method of attaching two panels of elongated, flexible ribbed composition board together comprising the steps of: positioning a first panel on the planar surface of a first support member of a substantially flat rigid planar structure such that the ribs extend outwardly thereof; detachably securing said first panel from horizontal movement along the planar surface of said first support member and detachably securing said first panel from vertical movement away from said surface; applying adhesive to the outwardly extending ribs; positioning one or more alignment members between the ribs of the first panel in spaced relationship such that said alignment members extend outwardly beyond the ribs; positioning a second panel on a second support member of a substantially flat rigid planar structure; detachably securing said second panel from horizontal movement along the planar surface of said support member and detachably securing said second panel from vertical movement away from said surface; applying adhesive to the ribs of said second panel; urging said second panel into engagement with the first panel such that the alignment members are engaged between the ribs of the second panel to align the ribs of the second panel with the ribs on the first panel; and applying a predetermined pressure to the support members for a predetermined period of time to compress the assembly.

2. A method of rigidly securing first and second elongated, flexible panels of particle board having a plurality of parallel spaced ribs extending outwardly from a flat surface to form a single honeycombed core comprising the steps of: positioning the first panel such that the ribs extend outwardly on a first support member, said support member having a flat surface on opposite sides thereof; detachably securing said first panel from horizontal movement along the planar surface of said first support member and detachably securing said first panel from vertical movement away from said surface; securing one or more alignment members between the ribs such that they extend outwardly from the ribs of the first panel; applying adhesive to the edges of the ribs of the second panel; positioning the second panel on a second support member, said support member having a flat surface on opposite sides thereof such that the ribs extend outwardly; detachably securing said second panel from horizontal movement along the planar surface of said second support member and detachably securing said second panel from vertical movement away from said surface; positioning the second panel and second support member over the first panel and first support member such that the ribs of the second panel engage the sides of the alignment members such that the alignment members slide between the corresponding ribs of the second panel and the edges of the ribs are aligned with the edges of the corresponding ribs of the first panel; urging the edges of the ribs into engagement to form a single core; stacking a plurality of first and second combined support members relative to each other such that the individual ribs on each of the combined panels are aligned in vertical relationship to support the corresponding ribs on the adjacent panel; and applying external pressure evenly over the stack of combined first and second support members and panels for a predetermined period of time.

3. The method called for in claim 1 with the additional step of: positioning the support members over dowels such that the dowels extend through apertures in the support members and temporarily lock the support members in position to maintain vertical alignment of said rib panels.

* * * * *